United States Patent
Mitran et al.

(10) Patent No.: US 9,507,574 B2
(45) Date of Patent: Nov. 29, 2016

(54) METHOD, COMPUTER PROGRAM PRODUCT, AND DEVICE FOR SELECTIVELY ALLOCATING MEMORY

(75) Inventors: Marcel Mitran, Markham (CA); Vijay Sundaresan, North York (CA); Alexander Vaseilevskiy, Brampton (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2643 days.

(21) Appl. No.: 11/536,047

(22) Filed: Sep. 28, 2006

(65) Prior Publication Data

US 2008/0098371 A1   Apr. 24, 2008

(51) Int. Cl.
*G06F 9/44* (2006.01)
*G06F 9/45* (2006.01)

(52) U.S. Cl.
CPC .................. *G06F 8/425* (2013.01)

(58) Field of Classification Search
CPC .................................................. G06F 8/425
USPC ........................................................ 717/140
See application file for complete search history.

(56) References Cited

U.S. PATENT DOCUMENTS

| | | | | |
|---|---|---|---|---|
| 5,249,295 A * | 9/1993 | Briggs et al. | | 717/157 |
| 5,761,514 A * | 6/1998 | Aizikowitz et al. | | 717/158 |
| 6,090,156 A * | 7/2000 | MacLeod | | 717/157 |
| 6,317,869 B1 * | 11/2001 | Adl-Tabatabai et al. | | 717/132 |
| 6,427,189 B1 * | 7/2002 | Mulla et al. | | 711/122 |
| 6,523,173 B1 * | 2/2003 | Bergner et al. | | 717/152 |
| 6,941,545 B1 * | 9/2005 | Reese et al. | | 717/130 |
| 2003/0084082 A1 * | 5/2003 | Debes et al. | | 708/420 |
| 2005/0132139 A1 * | 6/2005 | Agaram et al. | | 711/128 |
| 2006/0004996 A1 * | 1/2006 | Gonion | | 712/241 |
| 2006/0059474 A1 * | 3/2006 | Bhansali et al. | | 717/151 |
| 2007/0169031 A1 * | 7/2007 | Harris | | 717/140 |
| 2008/0098371 A1 * | 4/2008 | Mitran et al. | | 717/140 |

OTHER PUBLICATIONS

Tyson et al. A Modified Approach to Data Cache Management. [online] (Dec. 1, 1995). IEEE, Proceedings of the 28th annual international symposium on Microarchitecture, pp. 93-103. Retrieved From the Internet <http://portal.acm.org/citation.cfm?id=225177>.*

Wall, David W. Global Register Allocation at Link Time. [online] (Jun. 27, 1986). ACM, Proceedings of the 1986 SIGPLAN symposium on Compiler construction, pp. 264-275. Retrieved From the Internet <http://portal.acm.org/citation.cfm?id=12276.13338&type=series>.*

(Continued)

*Primary Examiner* — Lewis A Bullock, Jr.
*Assistant Examiner* — Theodore Hebert
(74) *Attorney, Agent, or Firm* — Cantor Colburn LLP; William A. Kinnaman, Jr.

(57) ABSTRACT

Expressions are selectively retrieved from memory during compilation by scanning code for expressions that can be effectively accessed directly from highly cached memory without needing to be loaded into a register, e.g., expressions that are not modified by the rest of the code. The scanning may include examining the use of the expression. Those expressions may be retrieved directly from the highly cached memory rather than being loaded into registers. This reduces compilation time.

14 Claims, 4 Drawing Sheets

(56) References Cited

OTHER PUBLICATIONS

Tyson et al. A Modified Approach to Data Cache Management. [online] (Dec. 1, 1995). IEEE, Proceedings of the 28th annual international symposium on Microarchitecture, pp. 93-103. Retrieved From the Internet http://portal.acm.org/citation.cfm?id=225177.*

Wall, David W. Global Register Allocation at Link Time. [online] (Jun. 27, 1986). ACM, Proceedings of the 1986 SIGPLAN symposium on Compiler construction, pp. 264-275. Retrieved From the Internet http://portal.acm.org/citation.cfm?id=12276.13338&type=series.*

Tyson et al. (A Modified Approach to Data Cache Management).*

Wall, David W. (Global Register Allocation at Link Time).*

Appel, et al., "Optimal Spilling for CISC Machines with Few Registers", Sep. 8, 2000. 30 pages.

Briggs, et al. "Rematerialization." 11 pages.

Kim, et al. "Frequency Based Live Range Splitting and Rematerialization (Extended Abstract)" 12 pages.

Punjani, Mukta. "Register Rematerialization in GCC", GCC Developers' Summit, 2004, pp. 132-139.

\* cited by examiner

METHOD, COMPUTER PROGRAM PRODUCT, AND DEVICE FOR SELECTIVELY ALLOCATING MEMORY

BACKGROUND

The present disclosure relates generally to data processing and, more particularly, to retrieval of expressions.

Most computer programs need to process large amounts of different data items. However, most CPUs can only perform operations on a small fixed number of "slots" called registers. Even on machines that support memory operands, register access is considerably faster than memory access Therefore, it is more efficient to load data items to be processed into registers and unload them to memory when they are needed.

Figure 1:
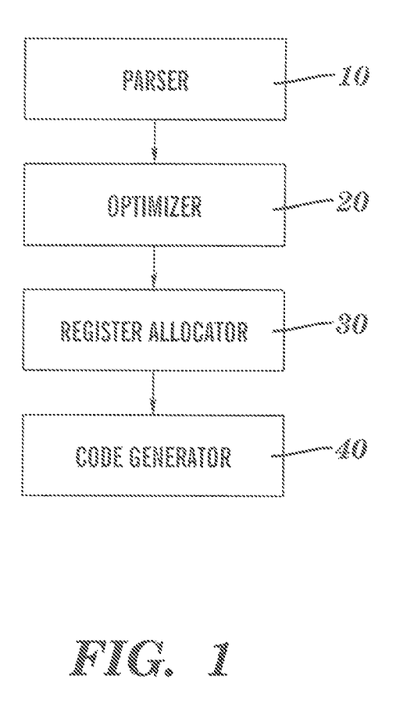
FIG. 1 illustrates a traditional compiler system.

For a computer to execute a program, the program must be compiled into a machine-readable form. In a compiler, source code is translated into a machine-readable-executable program. An example of a compiler is shown in FIG. 1. The compiler comprises a program which reads statements, i.e., source code written in a human-readable programming language, such as C++, and translates them into a machine-readable-executable program. The compiler includes four main components: a parser 10, an optimizer 20, a register allocator 30, and a code generator 40. The parser 10 translates the source code into an intermediate language (IL), which is understood by the compiler. The optimizer 20 performs various optimizing operations on the intermediate language to improve the execution performance of the compiled code. The register allocator 30 rewrites the symbolic registers generated in the intermediate language program to hardware registers defined on the target machine (computer). The code generator 40 translates the instruction in the intermediate language into executable instructions for the target machine and produces an executable program.

The register allocator 30 multiplexes a number of target program variables into a small number of CPU registers. The goal is to keep as many operands as possible in registers to maximize the speed of execution of the software program. Register allocation can happen over a basic block of a function within a program (local register allocation) or over a whole function/procedure (global register allocation) of a program.

Register allocation presents challenges because the number of variables in a typical program is much larger than the number of registers in a processor. So, the contents of some variables have to be saved or "spilled" into memory. The costs of spilling may be minimized by spilling the least frequently used variables first. However, it is not easy to know which variables will be used the least. Also, hardware and operating systems may impose restrictions on the usage of some registers.

It is typical for compiler optimizers to perform expression commoning (coalescing) early in the compilation process. The benefits of commoning are two-fold. First, the numbers of expressions that need to be processed by the optimizer are minimized, improving compilation overhead (desirable in dynamic compilers, such as a Just in Time (JIT) compiler). Second, this removes redundant computation from the resulting compiled code.

Despite the advantages of expression commoning, it can have negative effects on register allocations. In modern processing architectures, differences in data access time for values kept in registers as compared to those in memory may be quite high. Thus, compilers need efficient register allocation strategies to improve the runtime performance of code. In expression commoning, expressions are held in registers for longer durations in the compiled code. This may result in a greater overlap of expressions, hence greater competition for computational resources, such as registers. If the number of co-existing expressions exceeds the number of physical registers on the device, so called "register spilling" occurs, i.e., the compiler has to transfer or "spill" some expressions from registers to memory. Spilling uses stack-local memory to cache expressions until their next use. Thus, overhead for storing and reloading expressions are added to the compiled code.

Register rematerialization is a technique that has been used to improve register allocation by improving "spill" code generation. Rematerialization selectively reverses commoning by breaking up an expression into several copies. Rematerialization saves time by recomputing a value instead of loading it from memory. Thus, it is generally used when expressions can be easily re-constructed/recomputed at a lower cost than storing and retrieving them from memory. The typical use is for constant expressions that are generally cheap to construct.

Previous approaches to rematerialization have included identifying easy-to-re-compute values that are known to be constant for a given duration in the programs, for example immediate or target addresses. The recomputation involved in rematerialization adds overhead and slows down compilation.

Another approach begins by spilling aggressively to facilitate subsequent register allocation. This approach requires heavy overhead and slows down compilation, making it unsuitable for a dynamic compiler, such as JIT compiler.

Thus, there is a need for a technique for selectively retrieving expressions from memory in a manner that is that is effective and efficient.

SUMMARY

According to exemplary embodiments, methods, computer program products, and devices are provided for selectively retrieving expressions from memory during compilation. During compilation, code is scanned for expressions that can be effectively accessed directly from highly cached memory, e.g., an L1 cache, without being loaded into a register, e.g., expressions that are not modified by the rest of the code. The scanning may include examining the use of the expression. Those expressions are retrieved directly from the highly cached memory rather than being loaded into registers. This reduces compilation time.

According to an exemplary embodiment, scanning the code for expressions that can be effectively accessed from memory may include creating a bit vector to represent expressions in a code region and initializing bits as se, such that the expressions are initially candidates for retrieval from a highly cached memory. The code is then traversed, looking for uses of expressions for which the bits have not been reset, indicating that the uses of the expressions do not require that the expressions be loaded into registers but that they can, instead, be effectively accessed directly from memory.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

The detailed description explains exemplary embodiments of the invention, together with advantages and features, by way of example with reference to the drawings.

DETAILED DESCRIPTION

According to exemplary embodiments, a technique is provided for determining expressions that can be effectively retrieved directly from highly cached memory areas during compilation. These expressions can then leveraged directly from memory in future uses. This saves time during compilation, as the expressions need not be loaded from the highly cached memory areas into registers. The proposed technique is particularly suited for architectures that guarantee low-cost memory fetch of highly-cached memory segments, such as an execution stack (e.g., IBM's system Z architectures fetch values from a L1 cache in a single processor cycle), and that provide a rich group of memory-to-register operations (called RX/RXE/RXY on IBM's system Z architecture).

Figure 2:
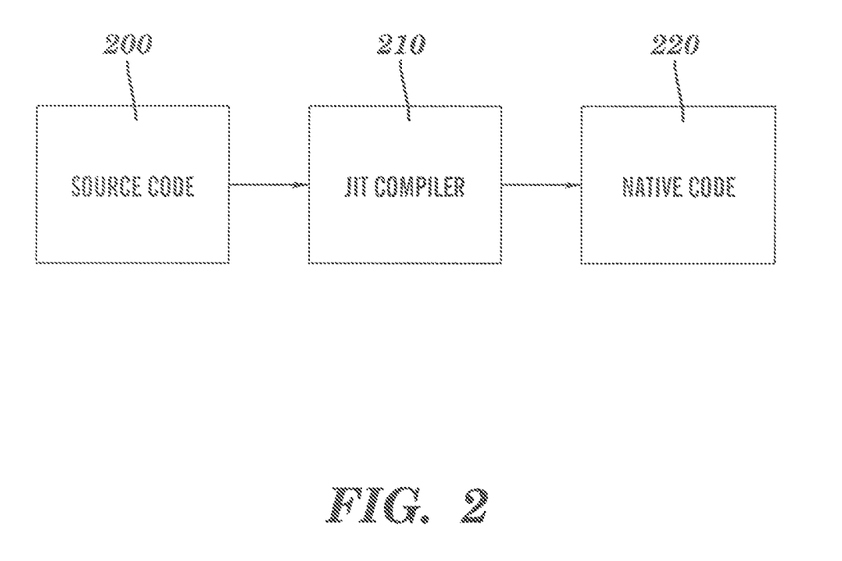
FIG. 2 illustrates an exemplary system for creating executable code in which expressions may be selectively retrieved from memory according to an exemplary embodiment.

FIG. 2 illustrates an exemplary system for producing executable code in which expressions may be selectively retrieved according to an exemplary embodiment. Source code 200 is compiled in a JIT compiler 210 into native executable code 220 for the processor on which it will be executed. The JIT compiler may first compile the source code into intermediate level code and then compile it into native code when needed for execution. According to an exemplary embodiment, the JIT compiler converts Java byte codes into specific code at run time for better performance. The JIT compiler translates the code when the program runs, in contrast to a regular compiler, which is used by programmers during development.

While the technique described herein is particularly useful for JIT compilers, it should be appreciated that its application is not limited to a JIT compiler. Rather, the technique described herein may be used for any type of compiler.

Figure 3:
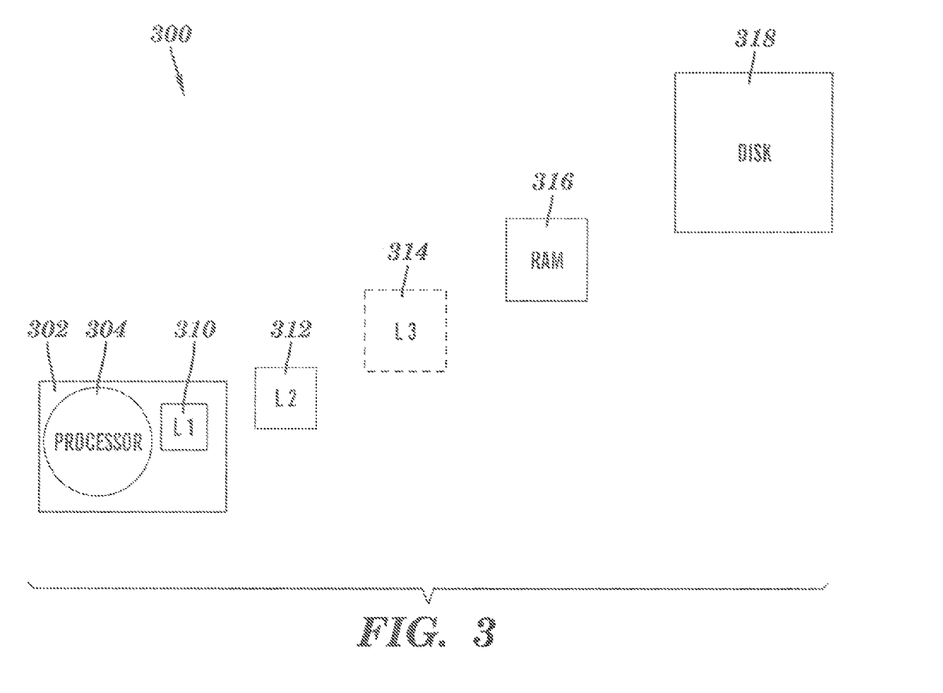
FIG. 3 illustrates a memory system according to an exemplary embodiment.

Memory management is important in computing environments, such as that shown in FIG. 2. FIG. 3 illustrates an exemplary system for managing memory via multiple levels with varying access speeds. The computer 300 shown in FIG. 3 includes one or more central processing units (CPUs) 302 which include processor(s) 304 and various levels of memory, including but not limited to an on-chip L1 cache 310, off chip L2 and L3 caches 312 and 314, respectively, random access memory (RAM) 316, disk storage 318, etc. Computers execute programs that have been processed into executable files. The processor fetches the instructions from memory, decodes the instructions, and executes the decoded instructions to perform various functions. To improve performance and speed, various levels of memory are used to increase the likelihood that an instruction or data will be available when needed. For example, instead of looking in RAM every time data or instructions are needed, the processor may check whether data or instructions are stored in a cache. Retrieving data or instructions from a cache is much faster than retrieving the same from RAM or a disk because it can be accomplished in fewer clock cycles.

Referring again to FIG. 3, the L1 cache is a Level 1 cache. This is the fastest cache memory available to the processor. It may contain on-chip SRAM cells. This cache may also be referred to as the primary cache. The L2 cache is a Level 2 cache. It is the second fastest memory available to a microprocessor (second only to the Level 1 cache). It may contain RAM chips near or on the processor. This cache may be referred to as a secondary cache. The L3 cached is a Level 3 cache. This is the third-fastest memory available to a microprocessor (following the Level 1 and Level 2 caches). The L3 cache is not common, but when it's present, it usually consists of SRAM chips near the processor. However, a few processors have integrated on-chip L3 caches.

According to an exemplary embodiment, uses of expressions are examined to determine whether they can be directly accessed from highly cached memory using memory instructions (i.e., "unspilled") or whether they need to be loaded from memory into registers using register instructions. If the use of an expression suggests that the expression can be cheaply exploited directly from memory, the expression is unspilled as such. According to exemplary embodiments, the heavy overhead of an iterative simplex framework is not required. The criterion for unspilling may be based on uses of the expressions, which results in a significantly reduced overhead that is particularly suited and lightweight enough for a dynamic compiler, such as a JIT compiler.

According to an exemplary embodiment, re-computation of certain L1 cached expressions is avoided by anchoring the expressions in memory and leveraging register-to-memory operations for future uses. Hence, the analysis is based on the type of expression and, more particularly, the analysis is use-based, as optimality is determined by how well expressions fit the memory-to-register semantics.

According to an exemplary embodiment, expressions that are not modified by the code body can be entirely anchored in memory. The strategic unspilling of such expressions is desirable, as the expression overlap in registers can be reduced at no cost by using memory-to-register instructions, if the expression is in a highly cached memory, such as a L1 cache. It is generally accepted that the execution stack is a highly cached memory area. Therefore, exemplary embodiments are focused on stack-based variables, such as locals or parameters.

Figure 4:
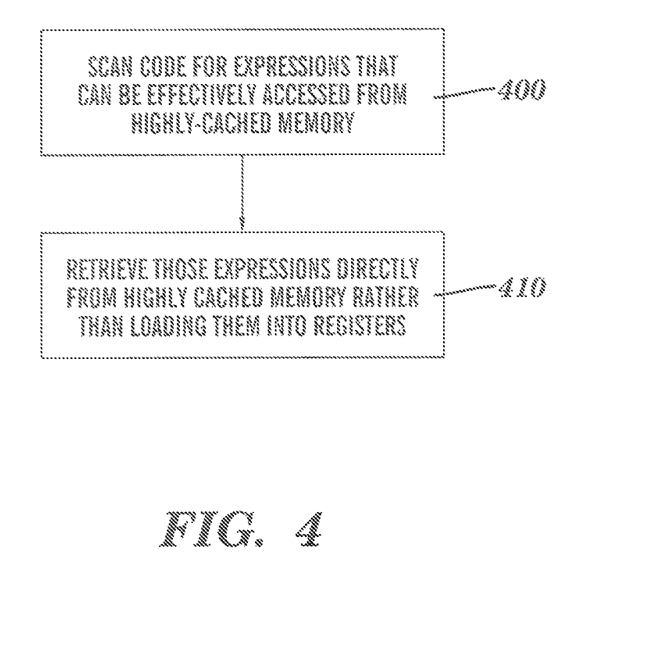
FIG. 4 illustrates a method for selectively retrieving expressions from memory according to an exemplary embodiment.

FIG. 4 illustrates a method for selectively retrieving expressions from memory according to an exemplary embodiment. This method may be implemented, for example, in a JIT compiler, such as that shown in FIG. 2. The method begins at step 400 at which the code is scanned for expressions that can be effectively accessed from highly cached memory, e.g., expressions that are not modified by the rest of the code. This involves examining the use of the expression. At step 410, those expressions are retrieved directly from the highly cached memory, that is, "unspilled", rather than being loaded into registers.

According to an exemplary embodiment, to determine expressions that can effectively retrieved directly from highly cached memory, i.e., "unspilled", a new bit vector is created to represent all expressions in a code region. All bits are initialized as set, implying that all expressions start out as being candidates for 'not assigning' to registers. The code area/region is traversed, looking for uses of expressions that have the bit set for 'not assigning'. If the use of the expression requires that the expression be loaded into a register, the bit corresponding to that expression is seen as reset. This means that the expression needs to be unloaded from memory into a register and cannot be effectively accessed directly from the highly cached memory. If no use of the expression caused the bit to be reset, then unspilling may be performed on the expression, i.e., the expression may be effectively retrieved directly from the highly cached memory.

According to exemplary embodiments, there may be additional constraints for unspilling expressions. For example, the expression should be invariant (for example, the stack symbol S should not be written to, if the expression is a simple load of symbol S). Also, the expression should be an unspilling candidate, i.e., there should exist a memory-register form for the instruction corresponding to the use of the expression on the target architecture. For example, for IBM's system Z architecture, this that means the expression should not be used in a binary operation where the other operand is a constant, the expression should not be a store, the expression should not be a call (on architectures that pass arguments in registers), and the expression should not be used in a binary operations where the other operand has already been unspilled. As an example, for an x+y use, if y is already unspilled, x should not be unspilled. According to an exemplary embodiment, if both x and y are candidates for unspilling, then the candidate with the greater number of uses is chosen for unspilling (where the number of uses takes into account the relative frequency of execution (where available) of basic blocks that the use occurs in).

Additional constraints based on specifics of the architecture can also be considered. For example, on some architectures, using an unspilled expression in an indirection, i.e., an expression referencing data using a name, reference, or a container instead of the value itself, can cause a pipeline stall. In such a case, it may be desirable to exclude sub-expressions that are directly used in the indirection from being unspilled as well. Hence, the unspilling candidate should not be used as a base for an indirection in that region of code, and it should not be used as an index/offset for an array indirection in that region of code.

The effectiveness of the technique described herein may be increased by applying the global commoning optimization to the code before running the pass. Global commoning creates stack-based temporary variables for expressions that are computed multiple times on an execution path and transforms uses of each expression that compute the expression redundantly to instead use the temporary variable. Since a primary focus of the technique described herein is on exploiting unspilling opportunities related to highly-cached stack memory segments, an optimization such as global commoning that increases the number of uses of stack locations increases the region of code that can be affected by unspilling. This allows the technique to be kept relatively simple without loss of generality.

As an example, consider the kernel routine below that has high register pressure inside of the loop. Passed parameters ki1, ki2, ki3, ki4, ki5, ki6 are the candidates for unspilling.

```
public static int[ ] intArrA = new int[100000];
public static int[ ] intArrB = new int[100000];
public static int[ ] intArrC = new int[100000];
public static int[ ] intArrD = new int[100000];
public static int[ ] intArrE = new int[100000];
static int kernel(int ki1, int ki2, int ki3, int ki4, int ki5, int ki6)
    {
    int ai1=1,s1=0,s2=0;
    for (int i=0;i<100000;i++)
        {
        s1=s1+ai1
        s2=s2+ai1;
        ai1+=ki1;        // ki1 used once
        intArrA[i]=ai1;
        ai1+=ki2;        // ki2 used once
        intArrB[i]=ai1;
        ai1+=ki3;        // ki3 used once
        intArrC[i]=ai1;
        ai1+=ki4;        // ki4 used once
        intArrD[i]=ai1;
        ai1+=ki5;        // ki5 used once
        intArrE[i]=ai1;
        ai1+=ki6;        // ki6 used once
        ai1+=ki1;        // ki1 re-used once to insure commoning
        ai1+=ki2;        // ki2 re-used once to insure commoning
        ai1+=ki3;        // ki3 re-used once to insure commoning
        ai1+=ki4;        // ki4 re-used once to insure commoning
        ai1+=ki5;        // ki5 re-used once to insure commoning
        ai1+=ki6;        // ki6 re-used once to insure commoning
        ai1+=s1;
        ai1+=s2;
        }
    return ai1;
    }
```

Below is an example of assembler code for the kernel loop generated by compiler for IBM's system Z architecture using the technique described above. Parameters ki1, ki2, ki3, ki4, ki5, ki6 are all kept in the registers and a total of 6 (3 loads and 3 stores) spill instructions are introduced.

```
Label L0002:
ST      GPR12,#232#SPILL4 Auto[<spill temp >] -12(,GPR5)  //Spill to stack
LR      GPR4,GPR11
LR      GPR7,GPR10
LR      GPR14,GPR9
LR      GPR9,GPR8
LR      GPR8,GPR6
LR      GPR0,GPR1
ST      GPR2,#234#SPILL4 Auto[<spill temp >] -36(,GPR5)  //Spill to stack
ST      GPR3,#233#SPILL4 Auto[<spill temp >] -40(,GPR5)  //Spill to stack
L       GPR2,#184 Parm[<parm 0 I>] 20(,GPR5)              //load ki1 to register
LR      GPR1,GPR0
AR      GPR1,GPR2                                          //ai1+=ki1;
```

-continued

```
ST    GPR1,#152 Shadow[<array-shadow>] 0(,GPR4)    //intArrA[i]=ai1
L     GPR3,#185 Parm[<parm 1 I>] 16(,GPR5)         //load ki2 to register
AR    GPR1,GPR3                                     //ai1+=ki2;
ST    GPR1,#152 Shadow[<array-shadow>] 0(,GPR7)    //intArrB[i]=ai1
L     GPR12,#186 Parm[<parm 2 I>] 12(,GPR5)        //load ki3 to register
AR    GPR1,GPR12                                    //ai1+=ki3;
ST    GPR1,#152 Shadow[<array-shadow>] 0(,GPR14)   //intArrC[i]=ai1
L     GPR11,#187 Parm[<parm 3 I>] 8(,GPR5)         //load ki4 to register
AR    GPR1,GPR11                                    //ai1+=ki4;
ST    GPR1,#152 Shadow[<array-shadow>] 0(,GPR9)    //intArrD[i]=ai1
L     GPR10,#188 Parm[<parm 4 I>] 4(,GPR5)         //load ki5 to register
AR    GPR1,GPR10                                    //ai1+=ki5;
ST    GPR1,#152 Shadow[<array-shadow>] 0(,GPR8)    //intArrE[i]=ai1
L     GPR6,#189 Parm[<parm 5 I>] 0(,GPR5)          //load ki6 to register
AR    GPR1,GPR6                                     //ai1+=ki6;
AR    GPR1,GPR2                                     //ai1+=ki1;
L     GPR2,#234#SPILL4 Auto[<spill temp >] -36(,GPR5)   //Spill from stack
AR    GPR1,GPR3                                     //ai1+=ki2;
L     GPR3,#233#SPILL4 Auto[<spill temp >] -40(,GPR5)   //Spill from stack
AR    GPR1,GPR12                                    //ai1+=ki3;
L     GPR12,#232#SPILL4 Auto[<spill temp >]-12(,GPR5)   //Spill from stack
AR    GPR1,GPR11                                    //ai1+=ki4;
AR    GPR1,GPR10                                    //ai1+=ki5;
AR    GPR1,GPR6                                     //ai1+=ki6;
AR    GPR2,GPR0
AR    GPR1,GPR2
AR    GPR3,GPR0
AR    GPR1,GPR3
LA    GPR6,#227 0(,GPR8)
LA    GPR8,#228 0(,GPR9)
LA    GPR9,#229 0(,GPR14)
LA    GPR10,#230 0(,GPR7)
LA    GPR11,#231 0(,GPR4)
CLR   GPR12,GPR6
BHRC  Label L0002
```

Below is another example of assembler code for the kernel loop generated by a compiler for IBM's system Z architecture using the technique described above. Parameters ki1, ki2, ki3, ki4, ki5, ki6 are kept in memory. Register-memory instructions are used to perform operations on them. All spills are eliminated, resulting in ~15% speedup of the test.

```
Label L0002:
LR    GPR4,GPR11
LR    GPR7,GPR10
LR    GPR14,GPR9
LR    GPR9,GPR8
LR    GPR8,GPR6
LR    GPR0,GPR1
A     GPR1,#184 Parm[<parm 0 I>] 20(,GPR5)    //ai1+=ki1;
ST    GPR1,#152 Shadow[<array-shadow>]         //intArrA[i]=ai1
      0(,GPR4)
A     GPR1,#185 Parm[<parm 1 I>] 16(,GPR5)    //ai1+=ki2;
ST    GPR1,#152 Shadow[<array-shadow>]         //intArrB[i]=ai1
      0(,GPR7)
A     GPR1,#186 Parm[<parm 2 I>] 12(,GPR5)    //ai1+=ki3;
ST    GPR1,#152 Shadow[<array-shadow>]         //intArrC[i]=ai1
      0(,GPR14)
A     GPR1,#187 Parm[<parm 3 I>] 8(,GPR5)     //ai1+=ki4;
ST    GPR1,#152 Shadow[<array-shadow>]         //intArrD[i]=ai1
      0(,GPR9)
A     GPR1,#188 Parm[<parm 4 I>] 4(,GPR5)     //ai1+=ki5;
ST    GPR1,#152 Shadow[<array-shadow>]         //intArrE[i]=ai1
      0(,GPR8)
A     GPR1,#189 Parm[<parm 5 I>] 0(,GPR5)     //ai1+=ki6;
A     GPR1,#184 Parm[<parm 0 I>] 20(,GPR5)    //ai1+=ki1;
A     GPR1,#185 Parm[<parm 1 I>] 16(,GPR5)    //ai1+=ki2;
A     GPR1,#186 Parm[<parm 2 I>] 12(,GPR5)    //ai1+=ki3;
A     GPR1,#187 Parm[<parm 3 I>] 8(,GPR5)     //ai1+=ki4;
A     GPR1,#188 Parm[<parm 4 I>] 4(,GPR5)     //ai1+=ki5;
A     GPR1,#189 Parm[<parm 5 I>] 0(,GPR5)     //ai1+=ki6;
AR    GPR2,GPR0
AR    GPR1,GPR2
```

-continued

```
AR    GPR3,GPR0
AR    GPR1,GPR3
LA    GPR6,#227 0(,GPR8)
LA    GPR8,#228 0(,GPR9)
LA    GPR9,#229 0(,GPR14)
LA    GPR10,#230 0(,GPR7)
LA    GPR11,#231 0(,GPR4)
CLR   GPR12,GPR6
BHRC  Label L0002
```

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for selectively retrieving expressions from memory during compilation, comprising:
    scanning code for expressions that can be effectively accessed from highly cached memory without being loaded into registers, wherein scanning the code includes:
        creating a bit vector to represent a plurality of expressions in a code region;
        initializing bits of the bit vector as set such that the expressions in the code region are initially marked as candidates for retrieval from the highly cached memory;
        determining whether a first expression of the expressions in the code region is modified by the code;
        resetting a bit associated with the first expression, of the bit vector responsive to determining that the first expression is modified by the code; and
        traversing the code region, looking for uses of expressions for which the bits of the bit vector associated with the expressions in the code region have not been reset; and
    retrieving the expressions for which the bits have not been reset, that can be effectively accessed directly from the highly cached memory rather than loading the expressions for which the bits have not been reset into the registers.

2. The method of claim 1, wherein the step of scanning the code includes examining the uses of the expressions.

3. The method of claim 1, wherein the highly cached memory is a L1 cache.

4. The method of claim 1, wherein if the bit is seen as reset for an expression, the expression is determined not to be effectively accessible directly from the highly cached memory.

5. The method of claim 1, further comprising applying global optimization to the code before scanning the code.

6. A computer program product for selectively retrieving expressions from memory during compilation, comprising a non-transitory computer usable storage medium having a computer readable program, wherein the non-transitory computer readable storage medium when executed on a computer, causes the computer to:
    scan code for expressions that can be effectively accessed from highly cached memory without being loaded into registers, wherein scanning the code includes:
        creating a bit vector to represent a plurality of expressions in a code region;
        initializing bits of the bit vector as set such that the expressions in the code region are initially marked as candidates for retrieval from the highly cached memory;
        determining whether a first expression of the expressions in the code region is modified by the code;
        resetting a bit associated with the first expression, of the bit vector responsive to determining that the first expression is modified by the code; and
        traversing the code region, looking for uses of expressions for which the bits of the bit vector associated with the expressions in the code region have not been reset; and
    retrieve the expressions for which the bits have not been reset, that can be effectively accessed directly from the highly cached memory rather than loading the expression for which the bits have not been reset into the registers.

7. The computer program product of claim 6, wherein the computer readable storage medium causes the computer to scan the code by examining the uses of the expressions.

8. The computer program product of claim 6, wherein the highly cached memory is a L1 cache.

9. The computer program product of claim 6, wherein if the bit is seen as reset for an expression, the expression is determined not to be effectively accessible directly from highly cached memory.

10. The computer program product of claim 6, wherein the computer readable storage medium causes the computer to apply global optimization to the code before scanning the code.

11. A device for selectively retrieving expressions from memory during compilation, comprising:
    highly cached memory configured to store expressions; and
    a processor configured to:
        scan code for expressions that can be effectively accessed from the highly cached memory, the scanning including creating a bit vector to represent a plurality of expressions in a code region, initializing bit of the bit vector as set such that the expressions in the code region are initially marked as candidates for retrieval directly from the highly cached memory, determining whether a first expression of the expressions in the code region is modified by the code, resetting a bit associated with the first expression, of the bit vector responsive to determining that the first expression is modified by the code, and traversing the code region, looking for uses of expressions for which the bits of the bit vector associated with the expressions in the code region have not been reset; and
        retrieve the expressions for which the bits have not been reset, that can be effectively accessed directly from the highly cached memory rather than loading the expressions for which the bits have not been reset into the registers.

12. The device of claim 11, wherein the processor is configured to scan the code by examining the uses of the expressions.

13. The device of claim 11, wherein the highly cached memory is a L1 cache.

14. The device of claim 11, wherein the processor is configured to apply global optimization to the code before scanning the code.

* * * * *